(12) United States Patent
Isobe et al.

(10) Patent No.: US 7,569,332 B2
(45) Date of Patent: Aug. 4, 2009

(54) PROCESSING METHOD OF THIN-FILM AND MANUFACTURING METHOD OF THIN-FILM MAGNETIC HEAD

(75) Inventors: Mitsuharu Isobe, Tokyo (JP); Hiromichi Umehara, Tokyo (JP); Hirotaka Gomi, Tokyo (JP); Tomohide Yokozawa, Kwai Chung (HK)

(73) Assignees: TDK Corporation, Tokyo (JP); SAE Magnetics (H.K.) Ltd., Kwai Chung (HK)

( * ) Notice: Subject to any disclaimer, the term of this patent is extended or adjusted under 35 U.S.C. 154(b) by 527 days.

(21) Appl. No.: 11/065,358

(22) Filed: Feb. 25, 2005

(65) Prior Publication Data

US 2005/0233260 A1    Oct. 20, 2005

(30) Foreign Application Priority Data

Mar. 2, 2004 (JP) .............. 2004-057346
Feb. 7, 2005 (JP) .............. 2005-029960

(51) Int. Cl.
*G03F 7/00* (2006.01)

(52) U.S. Cl. .................. 430/313; 430/315; 430/320; 430/30; 430/22; 430/395

(58) Field of Classification Search ................. 430/313, 430/315, 320, 311, 30, 22, 290, 395
See application file for complete search history.

(56) References Cited

U.S. PATENT DOCUMENTS

| | | | | | |
|---|---|---|---|---|---|
| 4,379,833 | A | * | 4/1983 | Canavello et al. | 430/315 |
| 4,399,205 | A | * | 8/1983 | Bergendahl | 430/30 |
| 5,721,651 | A | | 2/1998 | Kitahara | |
| 5,837,963 | A | | 11/1998 | Kitahara | |
| 6,399,285 | B1 | * | 6/2002 | Kamijima | 430/313 |
| 6,721,443 | B1 | | 4/2004 | Nakata | |
| 2002/0037475 | A1 | * | 3/2002 | Taguchi et al. | 430/273.1 |

FOREIGN PATENT DOCUMENTS

JP    10-214835    8/1998
JP    2001-066797  3/2001

* cited by examiner

*Primary Examiner*—Mark F Huff
*Assistant Examiner*—Caleen O Sullivan
(74) *Attorney, Agent, or Firm*—Oblon, Spivak, McClelland, Maier & Neustadt, P.C.

(57) ABSTRACT

A processing method of a thin-film includes a step of forming a predetermined pattern film or predetermined elements on a substrate or on a film formed in an upstream process, a step of forming a transparent film over the formed predetermined pattern film or predetermined elements, a step of forming a pattern-transferred film having shapes corresponding to shapes of the formed predetermined pattern film or predetermined elements, on the formed transparent film, and a step of forming an opaque film on the pattern-transferred film.

26 Claims, 5 Drawing Sheets

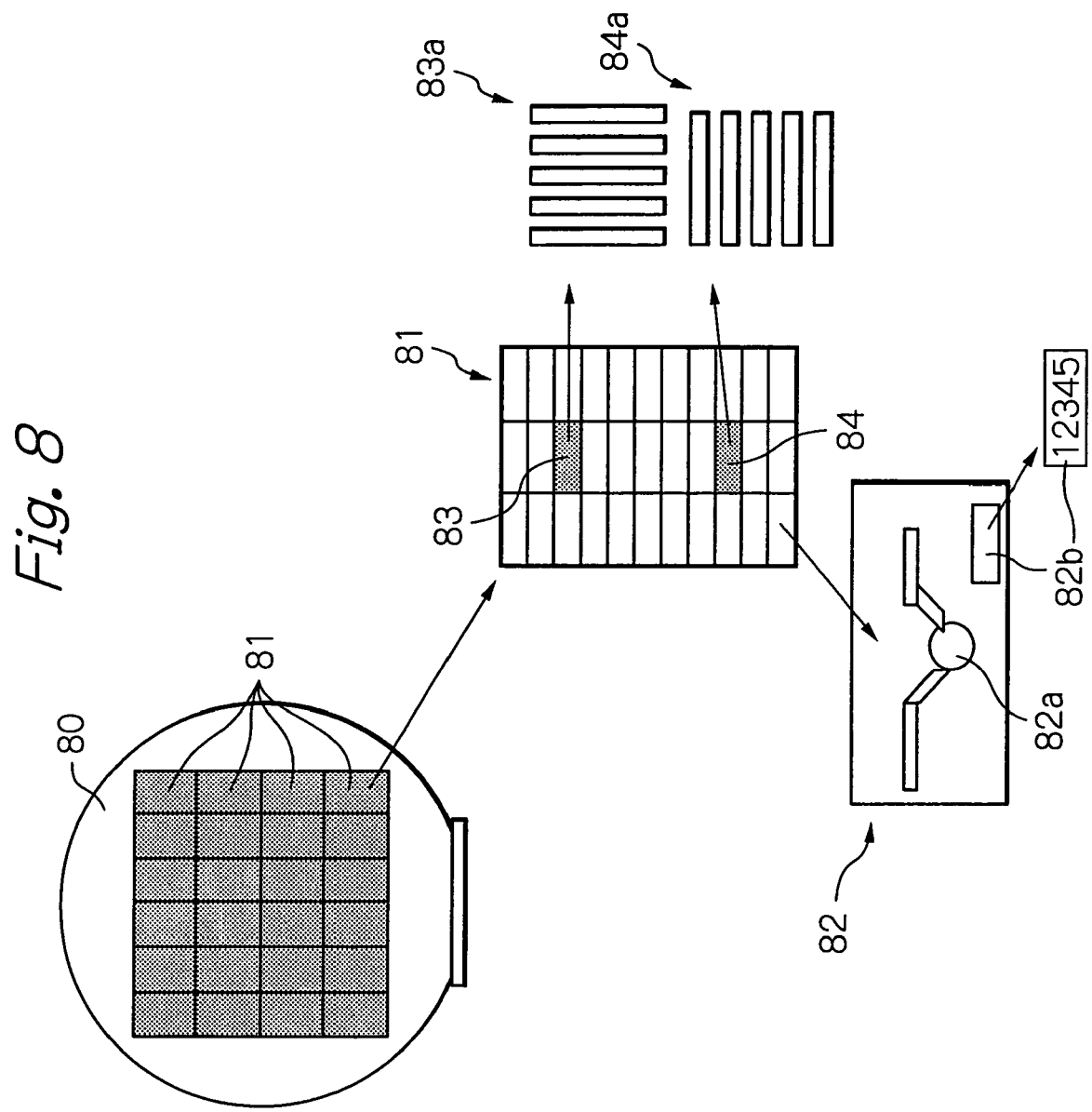

PROCESSING METHOD OF THIN-FILM AND MANUFACTURING METHOD OF THIN-FILM MAGNETIC HEAD

PRIORITY CLAIM

This application claims priority from Japanese patent application No. 2004-057346, filed on Mar. 2, 2004 and Japanese patent application No. 2005-029960, filed on Feb. 7, 2005, which are incorporated herein by reference.

BACKGROUND OF THE INVENTION

1. Field of the Invention

The present invention relates to a processing method of a thin-film in a thin-film wafer process and to a manufacturing method of a thin-film magnetic head using the processing method.

2. Description of the Related Art

In the thin-film wafer process for fabricating many thin-film magnetic heads on a wafer, formed are identification marks or addresses used for identifying each bar member with a plurality of aligned thin-film magnetic heads on the wafer or for identifying each thin-film magnetic head on the wafer.

U.S. Pat. Nos. 5,721,651 and 5,837,963 and U.S. Pat. No. 6,721,443 disclose methods each including steps of forming electromagnetic conversion elements and input/output electrodes on a wafer, depositing of a protection film thereon and forming identification marks on the deposited protection film by using a laser beam. If the identification marks are formed on the protection film that is the uppermost layer of the wafer as the methods disclosed in U.S. Pat. Nos. 5,721,651 and 5,837,963 and U.S. Pat. No. 6,721,443, it is possible to refer these identification marks after completing the wafer. However, such identification marks formed on the protection film can be utilized only in the processes executed after the protection film forming process. That is, in the upstream processes executed before the protection forming process, there is no such identification mark and therefore as a matter of course it is impossible to utilize such identification marks.

It is possible to form such identification marks or targets used as references for positioning the wafer in an upstream process executed before the protection film forming process. However, if an opaque film is formed on or above the formed identification marks or targets, it becomes impossible to refer these formed identification marks or targets in the downstream processes.

FIGS. 1a and 1b and FIGS. 2a and 2b are sectional views and plane views illustrating a part of a thin-film wafer process, used for providing an explanation about problems experienced by the inventors before the present invention. FIGS. 1a and 2a are A-A line sectional views of FIGS. 1b and 2b, respectively.

As shown in FIGS. 1a and 1b, when targets or addresses 12 and/or elements 13 are formed on a certain film 10 laminated on a wafer and a transparent film 14 such as an $Al_2O_3$ film is formed thereon, the targets or addresses 12 and the elements 13 can be seen through the transparent film 14 and thus can be referred at this stage.

However, as shown in FIGS. 2a and 2b, if an opaque film 16 such as a seed layer for plating for example is deposited thereon, the targets or addresses 12 and the elements 13 cannot be seen because they are hidden behind the opaque film 16. Therefore, in this case, it is impossible to use the targets or addresses 12 as references for positioning the wafer in the downstream processes and also it is impossible to identify the elements 13.

BRIEF SUMMARY OF THE INVENTION

It is therefore an object of the present invention to provide a processing method of thin-film in a thin-film wafer process and a manufacturing method of a thin-film magnetic head, whereby even if an opaque film is formed on or above targets and addresses during a thin-film process, these targets and addresses can be used as references.

According to the present invention, a processing method of a thin-film includes a step of forming a predetermined pattern film or predetermined elements on a substrate or on a film formed in an upstream process, a step of forming a transparent film over the formed predetermined pattern film or predetermined elements, a step of forming a pattern-transferred film having shapes corresponding to shapes of the formed predetermined pattern film or predetermined elements, on the formed transparent film, and a step of forming an opaque film on the pattern-transferred film. Also, according to the present invention, a manufacturing method of a thin-film magnetic head uses the above-mentioned thin-film processing method.

The pattern-transferred film to which the shapes of the predetermined pattern such as targets and/or addresses or the predetermined elements are transferred is formed on the transparent film. Thus, even when an opaque film is laminated thereon, three-dimensional shapes corresponding to the shapes of the targets and/or addresses or the elements appear at the opaque film. Therefore, even when the opaque film is laminated, the targets and/or addresses there under can be referred and also the position of the elements can be confirmed. Further, because it is not necessary to re-form the same targets or addresses on the opaque film at the same position from scratch, any displacement of the targets or addresses due to the re-forming never occurs.

It is preferred that the step of forming a pattern-transferred film includes laminating a photosensitive film on the formed transparent film, exposing the whole surface of the laminated photosensitive film, and developing the exposed photosensitive film. Because the predetermined pattern such as addresses and/or addresses that have been impossible to see or recognize can be transferred only by laminating the photosensitive film on the transparent film, by exposing the whole surface of the laminated photosensitive film and by developing, the transferring process becomes very simple.

It is also preferred that the photosensitive film includes a photo-resist material film or a photosensitive resin material film.

It is further preferred that the step of forming a predetermined pattern film or predetermined elements includes forming a pattern film or surface layers of elements by a material with a reflection coefficient different from that of the material of the substrate or the film formed in the upstream process.

It is preferred that the step of forming a predetermined pattern film includes forming a pattern film of a metal material.

It is also preferred that the step of forming a transparent film includes forming a transparent film with a thickness of 30 µm or less.

It is also preferred that the step of forming a transparent film includes forming a transparent film of $Al_2O_3$, $SiO_2$, AlN, SiN or SiC.

It is further preferred that the step of forming an opaque film includes forming an opaque film of a metal material.

It is still further preferred that the opaque film of a metal material is an electrode film for plating.

It is preferred that the predetermined pattern film includes targets constituting reference points for positioning, and/or addresses for identifying the elements.

Further objects and advantages of the present invention will be apparent from the following description of the preferred embodiments of the invention as illustrated in the accompanying drawings.

BRIEF DESCRIPTION OF THE SEVERAL VIEWS OF THE DRAWINGS

FIG. 8 shows a view illustrating regions for magnetic head elements, regions for targets and arrangement of addresses for identifying magnetic head elements.

DETAILED DESCRIPTION OF THE INVENTION

Figure 1A:
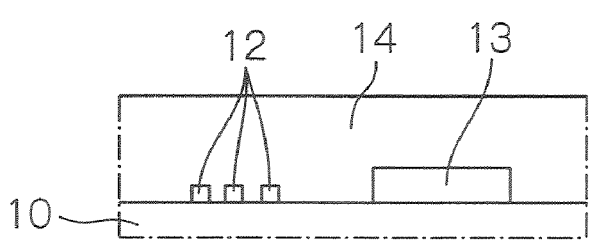
FIGS. 1a and 1b show a sectional view and a plane view illustrating a part of a thin-film wafer process, used for providing an explanation about problems experienced by the inventors before the present invention.
Figure 1B:
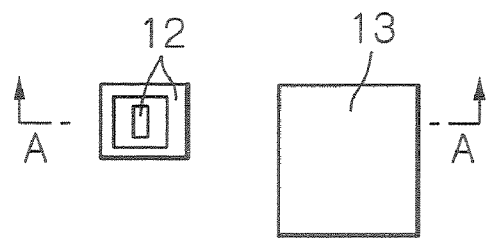
Figure 2A:
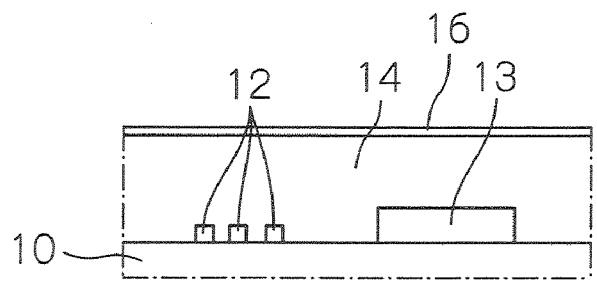
FIGS. 2a and 2b show a sectional view and a plane view illustrating a part of a thin-film wafer process, used for providing an explanation about problems experienced by the inventors before the present invention.
Figure 2B:
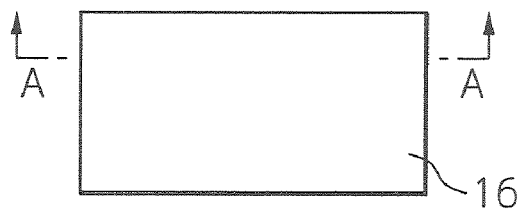
Figure 3:
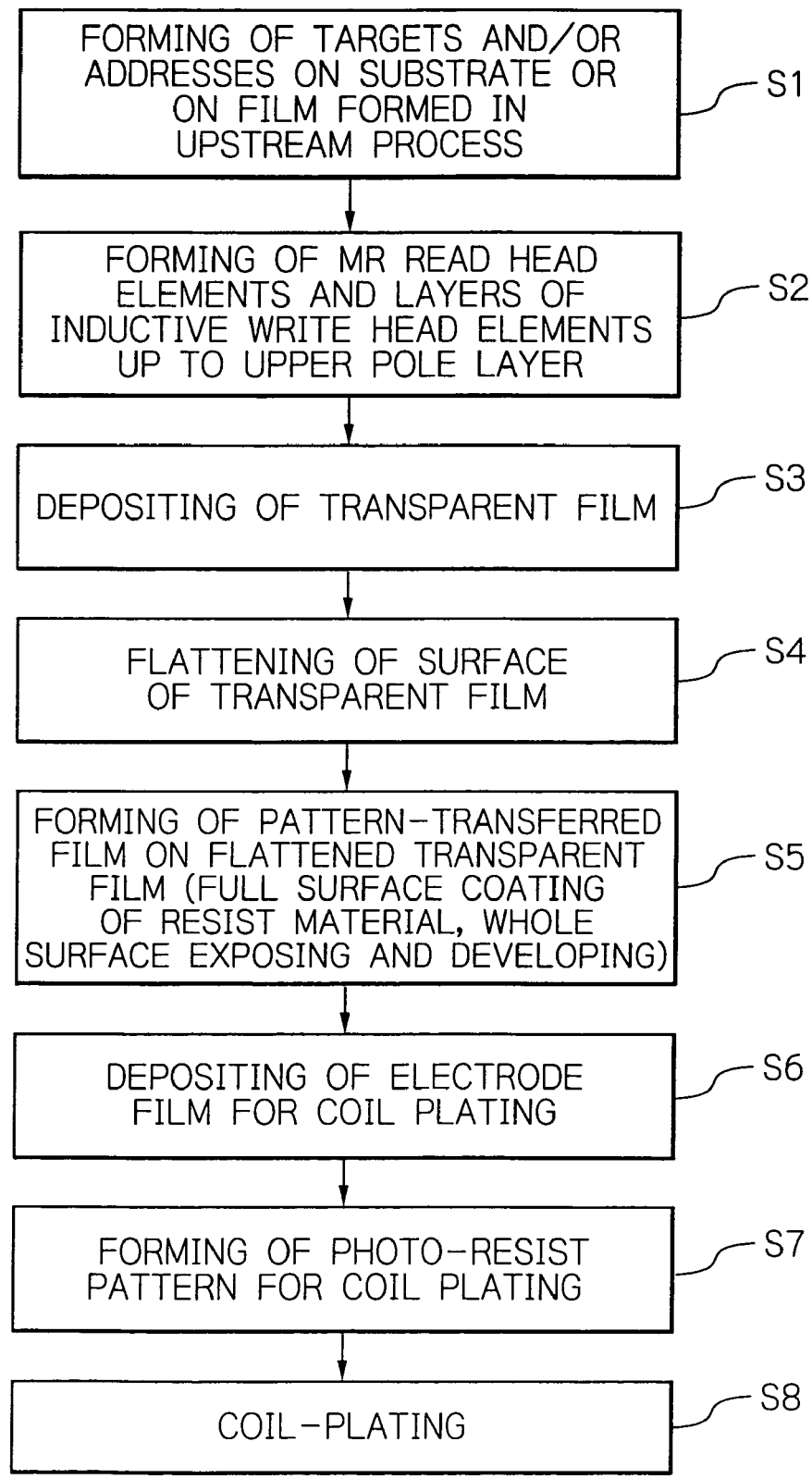
FIG. 3 shows a flow chart schematically illustrating a part of a thin-film wafer process in a manufacturing method of a thin-film magnetic head as a preferred embodiment according to the present invention.

FIG. 3 schematically illustrates flow of a part of a thin-film wafer process in a manufacturing method of a thin-film magnetic head as a preferred embodiment according to the present invention, and FIGS. 4a and 4b to FIGS. 7a and 7b illustrate parts of the thin-film wafer process in this embodiment. FIGS. 4a, 5a, 6a and 7a are A-A line sectional views of FIGS. 4b, 5b, 6b and 7b, respectively.

First, targets and/or addresses 42 made of a metal material such as Ti, NiFe or Ta for example are formed directly on a wafer or substrate, on an under film 40 of $Al_2O_3$ for example preliminarily laminated on the wafer, or on a film 40 formed in an upstream process (Step S1). The wafer may be made of for example $Al_2O_3$—TiC (AlTiC) or silicon. In case of the target, its size is about 4 μm×4 μm and its shape depends on the exposing device that uses the targets. It is desired that a line width of the target is 1 μm or more.

Then, magnetoresistive effect (MR) read head elements with the known structure are formed on the wafer or substrate by using the thin-film formation technique, and then, layers up to the upper magnetic pole layer, of inductive write head elements with the known structure are formed thereon by using the thin-film formation technique (Step S2).

As shown in FIG. 8, on the wafer 80 for thin-film magnetic heads, many shots or regions 81 each having a pattern transferred from a reticle by one exposing operation of an exposure or stepper equipment are formed. In each shot 81, many magnetic head element regions 82 and regions 83 and 84 for targets 83a and 84a with shapes depending upon the stepper equipment are formed. In each magnetic head element region 82, a magnetic head element 82a and an address for identifying the element or identifier (ID) 82b are formed.

Figure 4A:
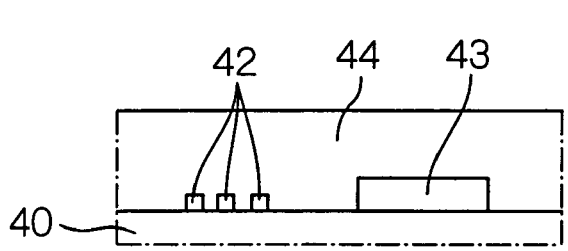
FIGS. 4a and 4b show a sectional view and a plane view illustrating a part of the thin-film wafer process in the embodiment of FIG. 3.
Figure 4B:
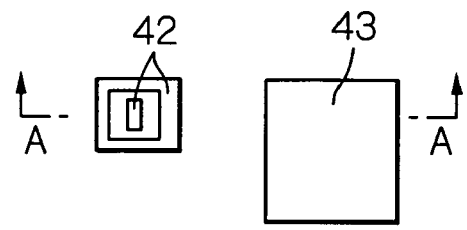

Then, a transparent film 44 for example made of an insulation material such as $Al_2O_3$, $SiO_2$, AlN, SiN or SiC is deposited thereon (Step S3). In modifications, the transparent film 44 may be made of a transparent non-insulation material. Thereafter, the surface of the deposited transparent film is flattened by polishing using chemical mechanical polishing (CMP) method for example (Step S4). This state after the surface planarization is shown in FIGS. 4a and 4b. In these figures, reference numeral 43 indicates the elements such as MR read head elements, inductive write head elements or other thin-film elements.

A thickness of the transparent film 44 is determined so that it is thicker than that of the targets and/or addresses 42 and the elements 43. It has been confirmed that the transparent film with the thickness of 6 μm can present good result. However, as will be described later, it is required that the thickness of the transparent film 44 is 30 μm or less.

Then, a pattern-transferred film of the targets and/or addresses 42 and the elements 43 is formed on the flattened transparent film 44 (Step S5).

Figure 5A:
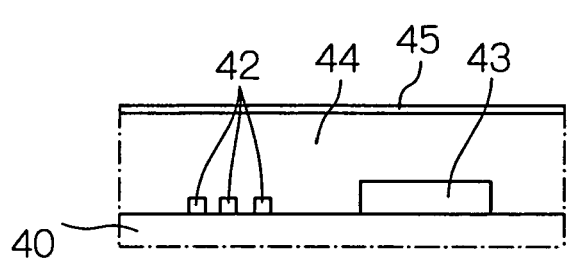
FIGS. 5a and 5b show a sectional view and a plane view illustrating a part of the thin-film wafer process in the embodiment of FIG. 3.
Figure 5B:
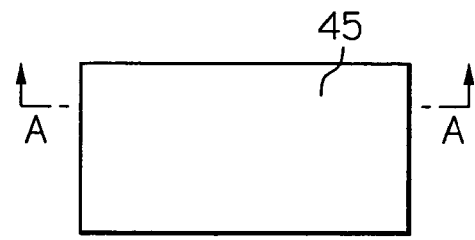
Figure 6A:
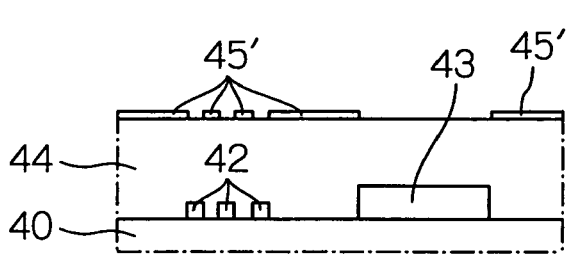
FIGS. 6a and 6b show a sectional view and a plane view illustrating a part of the thin-film wafer process in the embodiment of FIG. 3.
Figure 6B:
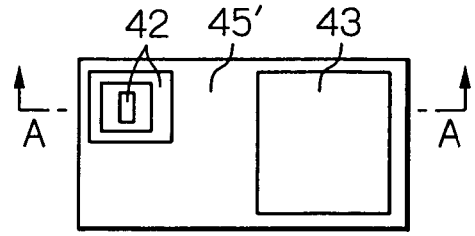

More concretely, as shown in FIGS. 5a and 5b, a resist film 45 is formed by coating a photo-resist material over the full surface of the transparent film 44, and then the whole surface of the formed resist film 45 is exposed and developed to form a pattern-transferred film 45' to which the shapes of the targets and/or addresses 42 and the elements 43 are transferred as shown in FIGS. 6a and 6b.

The substrate, the under film preliminarily laminated on the substrate or the film 40 formed in the upstream process is in general made of a material with a reflection coefficient different from that of the material of the targets and/or addresses 42 and from that of the material of the elements 43. Therefore, when the whole surface of the resist film 45 is exposed, the amount of light reflected from the surface of the substrate, the under film preliminarily laminated on the substrate or the film 40 formed in the upstream process and returned to the resist film 45 differs from that reflected from the surface of the targets and/or addresses 42 and the elements 43 and returned thereto. As a result, due to the difference of the exposure amount, the shapes of the targets and/or addresses 42 and the elements 43 are transferred to the resist film 45 to form the pattern-transferred film 45'.

Figure 9A:
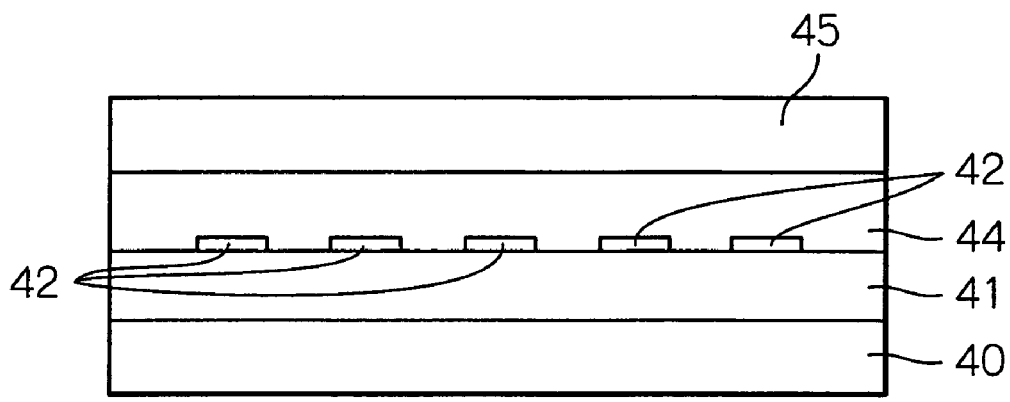
FIGS. 9a to 9c show sectional views illustrating more detail a process of forming a pattern-transferred film.
Figure 9B:
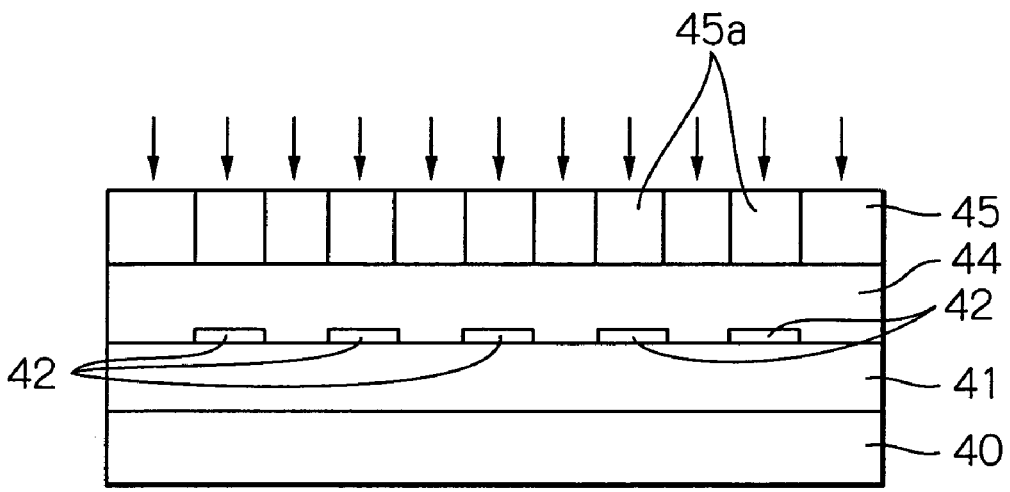
Figure 9C:
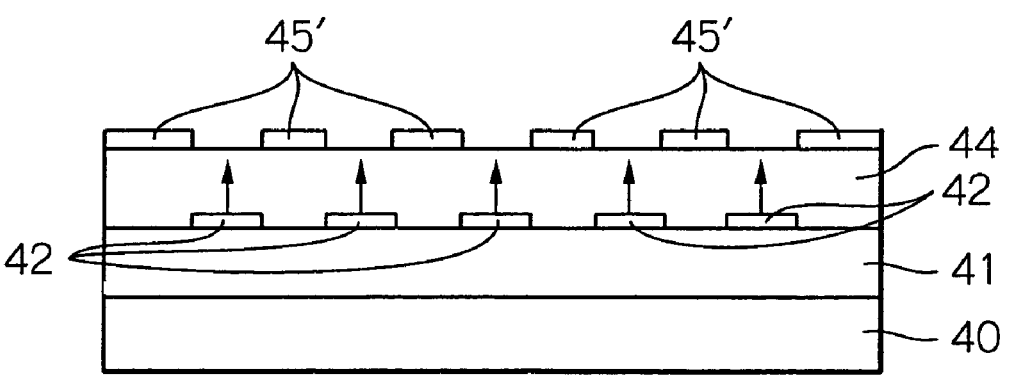

FIGS. 9a to 9c illustrate more detail this process of forming the pattern-transferred film.

As shown in FIG. 9a, on the substrate 40 made of AlTiC ($Al_2O_3$—TiC) that is inherently dark colored, the transparent film 42 made of an insulation material such as $Al_2O_3$, $SiO_2$, AlN, SiN or SiC for example is laminated. The predetermined pattern film, namely targets and/or addresses 42 made of a metal material such as Ti, NiFe or Ta for example are formed thereon. The targets and/or addresses 42 have a reflection coefficient greater than that of the substrate 40. Then, the transparent film 44 made of an insulation material such as $Al_2O_3$, $SiO_2$, AlN, SiN or SiC for example is laminated thereon, and the resist film 45 is formed by coating the photo-resist material over the full surface of the transparent film 44.

As for the photo-resist material, a positive-type resist material such as AZ5214 or AZ7904 of Clariant Corp., or SEPR- 1364-0.8 of Shin-Etsu Chemical Co., Ltd., a negative-type resist material such as PEK-500A25 of Sumitomo Chemical Co., Ltd., a reverse resist material such as AZ5206 of Clariant Corp., or other photo-resist material may be used. The resist film should have a thickness providing a sufficient reading contrast. That is about 30 nm or more but not necessary to be greatly thick. A thickness of about 1.6 μm is adequate.

Then, as shown in FIG. 9b, the whole surface of the resist film 45 is exposed at an exposure amount of about 150 mJ/cm$^2$. Thus, partial regions 45a of the resist film 45, which are positioned immediately above the targets and/or addresses 42, are additionally exposed by light reflected at the surface of the targets and/or addresses 42.

Then, as shown in FIG. 9c, by developing the exposed resist film 45, the pattern-transferred film 45' with a transferred pattern of the targets and/or addresses 42 is formed.

Instead of the photo-resist material, a photosensitive resin material such as a photosensitive polyimide for example may be used.

Figure 7A:
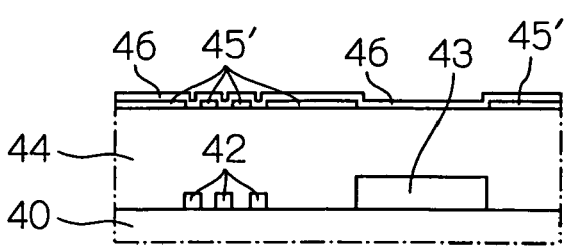
FIGS. 7a and 7b show a sectional view and a plane view illustrating a part of the thin-film wafer process in the embodiment of FIG. 3.
Figure 7B:
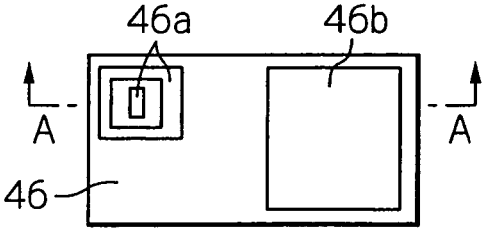

Thereafter, an opaque film 46 such as an electrode film for coil plating for example is laminated by sputtering (Step S6). Thus, as shown in FIGS. 7a and 7b, three-dimensional shapes 46a and 46b corresponding to the shapes of the targets and/or addresses 42 and the elements 43 appear at the opaque film 46 as protrusions. Therefore, it is possible to refer the targets and/or addresses 42 and also possible to confirm the position of the elements 43.

Thus, a photo-resist pattern for coil plating can be formed with reference to these targets and/or addresses 42 (Step S7), and then coil plating can be actually executed using the formed photo-resist pattern (Step S8).

As aforementioned, according to this embodiment, the photosensitive film such as the resist film 45 is laminated on the transparent film 44, and the whole surface of the laminated photosensitive film is exposed and then developed to form the pattern-transferred film 45' to which the shapes of the targets and/or addresses 42 or the elements 43 are transferred. Thus, even when the opaque film 46 is laminated thereon, three-dimensional shapes corresponding to the shapes of the targets and/or addresses 42 or the elements 43 appear at the opaque film 46. Therefore, even when the opaque film 46 is laminated, the targets and/or addresses 42 there under can be referred and also the position of the elements 43 can be confirmed. Further, because it is not necessary to re-form the same targets or addresses on the opaque film 46 at the same position from scratch, any displacement of the targets or addresses due to the re-forming never occurs. Furthermore, because the shapes of the targets and/or addresses 42 or the elements 43 can be transferred only by exposing the whole surface of the resist film 45, the transferring can be attained by a very simple process.

It has been confirmed by the following experiments 1 to 3 that the maximum permissible thickness of the transparent film 44 is 30 μm.

In the experiments 1 and 2, a Ti target pattern of 4 μm×4 μm square was formed on a substrate, a transparent film with 4 μm thick (in the experiment 1) or a transparent film with 30 μm thick (in the experiment 2) was laminated thereon, and then a resist film with 0.5 μm thick was laminated thereon by coating the positive type resist material of AZ7904 of Clariant Corp. over the full surface of the transparent film. Thereafter, a pre-baking process, a whole-surface exposing process, a post-baking (PEB) process and a developing process were performed, and then the transferring state of the target pattern was observed. The conditions of these processes were as follows:

Pre-baking process; 95° C., 90 seconds,
Exposure amount in exposing process; 60-120 mJ, 1 mJ steps,
Post-baking process; 140° C., 150 seconds,
Developing process; CD-21T, 58 seconds×1.

In the experiment 3, a Ti target pattern of 4 μm×4 μm square was formed on a substrate, a transparent film with 4 μM thick was laminated thereon, and then a resist film with 1.65 μm thick was laminated thereon by coating the positive type resist material of AZ5214 of Clariant Corp. over the full surface of the transparent film. Thereafter, a pre-baking process, a whole-surface exposing process and a developing process were performed, and then the transferring state of the target pattern was observed. The conditions of these processes were as follows:

Pre-baking process; 95° C., 360 seconds,
Exposure amount in exposing process; 150 mJ,
Developing process; CD-24T, 10 seconds×4.

According to the experiments 1 and 3 (transparent films with 4 μm thick were used), the target patterns were precisely transferred and thus sharp edges of the patterns were clearly recognized. However, according to the experiment 2 (transparent film with 30 μm thick was used), the target pattern was transferred with difficulty to make blurred edge and thus it was quite difficult to clearly recognize the edge. Therefore, the target pattern formed in the experiment 2 was impossible to use as targets and was barely able to use as an addresses. As a result of these experiments, it was concluded that the permissible thickness of the transparent film is 30 μm or less.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A processing method of a thin-film comprising the steps of:
   forming a predetermined pattern film or predetermined elements on a substrate or on a film formed in an upstream process;
   forming a transparent film over the formed predetermined pattern film or predetermined elements;
   forming a pattern-transferred film, having three-dimensional protruded shapes corresponding to shapes of the formed predetermined pattern film or predetermined elements, on the formed transparent film, said shapes of the formed predetermined pattern film or predetermined elements being transferred to said pattern-transferred film by utilizing difference in the amount of light reflected perpendicularly from surfaces of the substrate or the film formed in an upstream process and of the formed predetermined pattern film or predetermined elements; and
   forming an opaque film on said pattern-transferred film, the opaque film completely covering the three-dimensional protruded shapes of said pattern-transferred film and having three-dimensional shapes corresponding to the shapes of the formed predetermined pattern film or predetermined elements and appearing as protrusions,
   the three-dimensional shapes appearing in said opaque film as protrusions being used to refer themselves to the shapes of said predetermined pattern film or to confirm the position of said predetermined elements when forming another film on said opaque film.

2. The method as claimed in claim 1, wherein said step of forming a pattern-transferred film comprises laminating a photosensitive film on the formed transparent film, exposing the whole surface of the laminated photosensitive film, and developing the exposed photosensitive film.

3. The method as claimed in claim 2, wherein said photosensitive film comprises a photo-resist material film or a photosensitive resin material film.

4. The method as claimed in claim 1, wherein said step of forming a predetermined pattern film or predetermined elements comprises forming a pattern film or surface layers of elements by a material with a reflection coefficient different from that of the material of said substrate or said film formed in the upstream process.

5. The method as claimed in claim 1, wherein said step of forming a predetermined pattern film comprises forming a pattern film of a metal material.

6. The method as claimed in claim 1, wherein said step of forming a transparent film comprises forming a transparent film with a thickness of 30 μm or less.

7. The method as claimed in claim 1, wherein said step of forming a transparent film comprises forming a transparent film of $Al_2O_3$, $SiO_2$, AlN, SiN or SiC.

8. The method as claimed in claim 1, wherein said step of forming an opaque film comprises forming an opaque film of a metal material.

9. The method as claimed in claim 8, wherein said opaque film of a metal material is an electrode film for plating.

10. The method as claimed in claim 1, wherein said predetermined pattern film comprises targets constituting reference points for positioning.

11. The method as claimed in claim 1, wherein said predetermined pattern film comprises addresses for identifying the elements.

12. A manufacturing method of a thin-film magnetic head using a thin-film processing method that comprises the steps of:
    forming a predetermined pattern film or predetermined elements on a substrate or on a film formed in an upstream process;
    forming a transparent film over the formed predetermined pattern film or predetermined elements;
    forming a pattern-transferred film, having three-dimensional protruded shapes corresponding to shapes of the formed predetermined pattern film or predetermined elements, on the formed transparent film, said shapes of the formed predetermined pattern film or predetermined elements being transferred to said pattern-transferred film by utilizing difference in the amount of light reflected perpendicularly from surfaces of the substrate or the film formed in an upstream process and of the formed predetermined pattern film or predetermined elements; and
    forming an opaque film on said pattern-transferred film, the opaque film completely covering the three-dimensional protruded shapes of said pattern-transferred film and having three-dimensional shapes corresponding to the shapes of the formed predetermined pattern film or predetermined elements and appearing as protrusions,
    the three-dimensional shapes appearing in said opaque film as protrusions being used to refer themselves to the shapes of said predetermined pattern film or to confirm the position of said predetermined elements when forming another film on said opaque film.

13. The manufacturing method as claimed in claim 12, wherein said step of forming a pattern-transferred film comprises laminating a photosensitive film on the formed transparent film, exposing the whole surface of the laminated photosensitive film, and developing the exposed photosensitive film.

14. The manufacturing method as claimed in claim 13, wherein said photosensitive film comprises a photo-resist material film or a photosensitive resin material film.

15. The manufacturing method as claimed in claim 12, wherein said step of forming a predetermined pattern film or predetermined elements comprises forming a pattern film or surface layers of elements by a material with a reflection coefficient different from that of the material of said substrate or said film formed in the upstream process.

16. The manufacturing method as claimed in claim 12, wherein said step of forming a predetermined pattern film comprises forming a pattern film of a metal material.

17. The manufacturing method as claimed in claim 12, wherein said step of forming a transparent film comprises forming a transparent film with a thickness of 30 μm or less.

18. The manufacturing method as claimed in claim 12, wherein said step of forming a transparent film comprises forming a transparent film of $Al_2O_3$, $SiO_2$, AlN, SiN or SiC.

19. The manufacturing method as claimed in claim 12, wherein said step of forming an opaque film comprises forming an opaque film of a metal material.

20. The manufacturing method as claimed in claim 19, wherein said opaque film of a metal material is an electrode film for plating.

21. The manufacturing method as claimed in claim 12, wherein said predetermined pattern film comprises targets constituting reference points for positioning.

22. The manufacturing method as claimed in claim 12, wherein said predetermined pattern film comprises addresses for identifying the elements.

23. The method as claimed in claim 1, wherein the forming a pattern-transferred film comprises forming on the formed transparent film the pattern-transferred film by transferring to the pattern-transferred film one shape for each of the shapes of the formed predetermined pattern film or predetermined elements.

24. The method as claimed in claim 12, wherein the forming a pattern-transferred film comprises forming on the formed transparent film the pattern-transferred film by transferring to the pattern-transferred film one shape for each of the shapes of the formed predetermined pattern film or predetermined elements.

25. The method as claimed in claim 1, wherein the three-dimensional protruded shapes of the pattern-transferred film that correspond to the shapes of the formed predetermined pattern film or predetermined elements are directly above the shapes of the formed predetermined pattern film or predetermined elements.

26. The method as claimed in claim 12, wherein the three-dimensional protruded shapes of the pattern-transferred film that correspond to the shapes of the formed predetermined pattern film or predetermined elements are directly above the shapes of the formed predetermined pattern film or predetermined elements.

* * * * *